Aug. 8, 1961    C. MADDOX    2,995,277
TOBACCO SEED SOWER
Filed Dec. 24, 1958    2 Sheets-Sheet 1
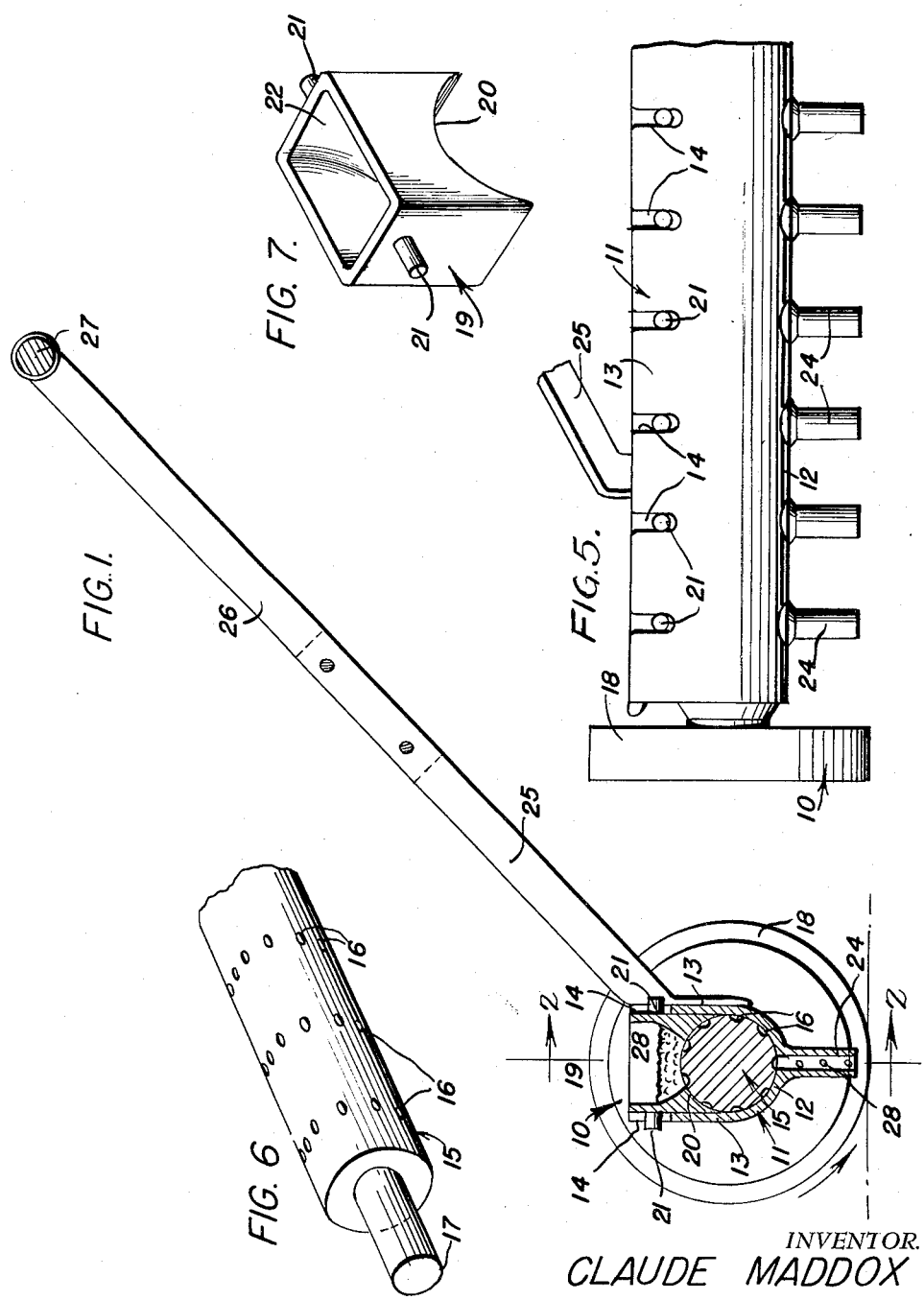
INVENTOR.
CLAUDE MADDOX
BY *Victor J. Evans & Co.*
ATTORNEYS

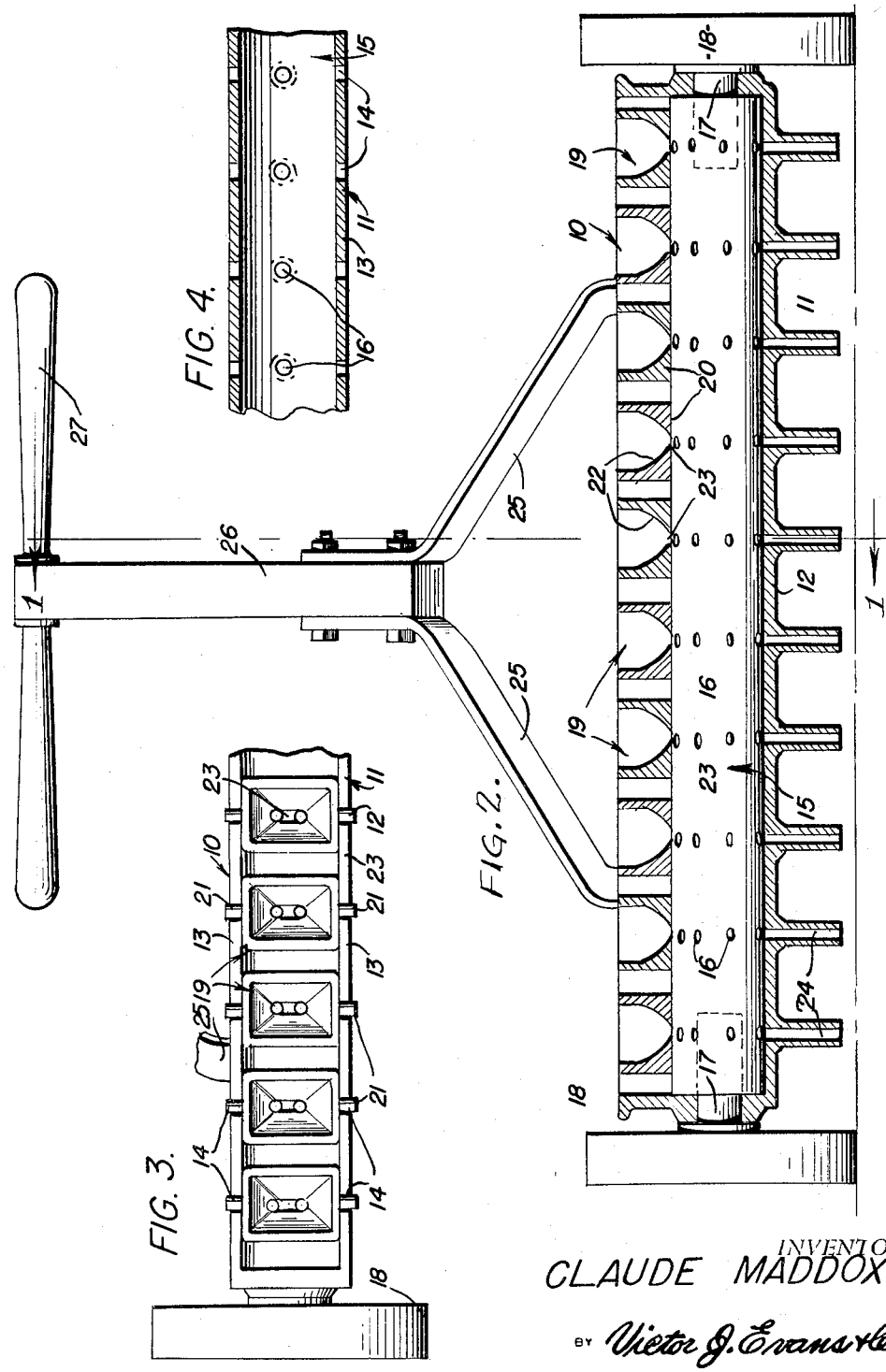

United States Patent Office 2,995,277
Patented Aug. 8, 1961

2,995,277
TOBACCO SEED SOWER
Claude Maddox, Rte. 2, Flemingsburg, Ky.
Filed Dec. 24, 1958, Ser. No. 782,944
1 Claim. (Cl. 222—139)

This invention relates to an agricultural implement, and more particularly to a seed sower or planter.

The object of the invention is to provide a machine which is especially suitable for use in sowing or planting seeds such as tobacco seeds.

Another object of the invention is to provide a seed sowing machine which will sow or plant seeds in the most advantageous pattern or manner and wherein the seed sowing machine of the present invention is adapted to be moved along the ground being worked so as to evenly and uniformly plant the seeds in the desired location.

A further object of the invention is to provide a seed sowing machine which is extremely simple and inexpensive to manufacture.

Other objects and advantages will be apparent during the course of the following description.

In the accompanying drawings, forming a part of this application, and in which like numerals indicate like parts throughout the same.

FIGURE 1 is a sectional view taken on line 1—1 of FIGURE 2.

FIGURE 2 is a sectional view taken on line 2—2 of FIGURE 1.

FIGURE 3 is a fragmentary plan view illustrating the seed sower of the present invention.

FIGURE 4 is a sectional fragmentary plan view similar to FIGURE 3 but with the hopper removed.

FIGURE 5 is a fragmentary elevational view showing certain structural details of the device.

FIGURE 6 is a fragmentary perspective view showing the roller.

FIGURE 7 is a perspective view of one of the hoppers.

Referring in detail to the drawings, the numeral 10 indicates the seed sowing machine of the present invention which is shown to comprise a support member which is indicated generally by the numeral 11. The support member 11 includes a curved bottom portion 12 as well as spaced parallel vertically disposed side portions 13. The side portions 13 are provided with spaced apart opposed slots 14, for a purpose to be later described.

The numeral 15 indicates a roller, FIGURE 6, and the roller 15 is arranged in the support member 11. The roller 15 is provided with a plurality of spaced apart pockets or openings 16. Extending outwardly from the ends of the roller 15 are trunnions 17, and ground engaging wheels 18 are connected to the trunnions 17, FIGURE 1.

There is further provided a plurality of similar hoppers which are each indicated by the numeral 19, and each hopper 19 includes an arcuate recessed bottom 20 for engagement with the rotating roller 15. Pins 21 extend from the hopper 19, and the pins 21 are seated in the slots 14. The hoppers 19 are each provided with slanting bottom portions 22 and there is provided in each hopper adjacent the lower end thereof an aperture or opening 23, whereby seeds, such as tobacco seeds can pass down through the opening 23 and into the pockets or openings 16 in the rotating roller 15. The numeral 24 designates each of a plurality of discharge spouts which depend from the support member 11 and which are secured thereto or formed integral therewith, and it is to be noted that the spouts 24 are arranged in alignment with the hoppers 19. Similarly the pockets 16 are arranged in groups or sets which have a generally circular arrangement, and the groups of pockets 16 are also aligned with the hoppers 19 and discharge spouts 24.

Thus, the tobacco seeds from the hoppers 19 can pass down through the apertures 23 and then into the pockets 16, and then the seeds will be discharged downwardly through the spouts 24 into the desired area of the ground being worked.

There is further provided a pair of spaced apart bars 25 which are secured in any suitable manner to the rear of the support member 11, and a handle 26 is connected to the upper rear portion of the bar 25, there being a hand gripping member 27 connected to the upper rear end of the handle 26, and this construction permits the device 10 to be readily moved along the ground being worked on.

From the foregoing, it is apparent that there has been provided a seed planting machine which is especially suitable for planting seeds such as tobacco seeds. In use, the tobacco seeds to be planted are adapted to be arranged in the hoppers 19, and the hoppers 19 are arranged so that the pins 21 extend through the slots 14 in the support member 11. It is to be noted that the hoppers 19 have a recessed bottom portion 20 which is of arcuate formation so as to snugly conform to the curvature of the rotating roller 15. The pockets 16 or openings are arranged in circular groups as shown in FIGURE 6, and these pockets 16 are aligned with the hoppers 19 as well as with the discharge spouts 24. The wheels 18 are connected in any suitable manner to trunnions 17 which project from the ends of the roller 15.

In use, with the hoppers 19 loaded with seeds such as tobacco seeds, and with the parts arranged as shown in the drawings, it will be seen that a person is adapted to grip the members 27 with the hand and then push the machine along the ground and the rotating wheels 18 permit the device to be readily moved along the ground which is to be planted with the seeds. As the device is moved along the ground, it will be seen that the seeds will drop downward through the apertures 23 in the hoppers 19, and the tapered surfaces 22 of the hoppers 19 help guide the seeds toward the opening 23. These seeds passing downwardly through the openings 23 are received or positioned in the pockets 16 of the roller 15, and as the wheels 18 turn, they cause rotation of the roller 15. This rotation of the roller 15 causes the seeds in the pockets 16 to be carried around so that as for example as shown in FIGURE 2, the seeds which are indicated by the numeral 28 in FIGURE 2, will be carried around by the pockets 16 until the pockets move into registering or aligned with the discharge spouts 24 whereby the seeds will then be able to drop down through the spouts 24 into the desired position in the ground.

It is to be noted that as the machine is moved along the ground the roller 15 continually rotates so that additional seeds will be able to leave the hoppers 19 and then discharge down through the spouts 24.

When desired, the hoppers 19 can be readily lifted up or removed since the pins 29 provide a detachable mounting for the hoppers. The slots 14 through which the pins 21 extend insure that the hoppers will be maintained in their proper aligned position with respect to the pockets 16 and discharge spouts 24.

The parts may be made of any suitable material and in different shapes or sizes.

While the present invention has been described for use in planting tobacco seeds, it is to be understood that other types of seeds or materials can be distributed or handled thereby.

The device is adapted to be pushed along the ground by means of the previously described handle construction. The device is especially suitable for sowing tobacco seeds and it is a small implement of simple and rugged construction, which consists of a minimum number of parts which will not readily get out of order. The roller turns as the wheels 18 turn and the pockets or openings 16 are properly spaced and of such a size so as to hold or receive only one seed. The curvature 20 insures that the pockets 16 will only hold and receive one seed and the seed hoppers have their entire weight resting on the roller. The pins 21 prevent the hoppers from slipping out of their proper positions, and the spouts 24 insure that the seeds will be guided to their proper location on the ground even though the wind may be blowing.

The present invention will facilitate the planting of seeds such as tobacco seeds and since tobacco seeds are quite small and difficult to sow or plant, it will be seen that such tobacco seeds can be evenly distributed or planted so that the tobacco plants will be properly spaced in such a manner as to insure their most efficient growth since the tobacco plants will not be spaced too close together nor will they be spaced too far apart. It is well known that tobacco plants must be spaced a certain distance apart in order to get maximum growth conditions. For example, if the tobacco plants are too close together they will be weak and will not obtain full size, and similarly if the tobacco plants are too far apart there are certain disadvantages, and with the present invention these difficulties will be overcome. Thus, a farmer using the device of the present invention will be able to grow tobacco or other crops in a more efficient manner which will result in greater profit to the farmer or other person using the device.

Minor changes in shape, size and rearrangement of details coming within the field of invention claimed may be resorted to in actual practice, if desired.

I claim:

A seed sowing machine comprising a support member embodying a curved bottom portion and spaced parallel vertically disposed side portions, there being spaced apart diametrically opposed slots in said side portions, a plurality of spaced parallel vertically disposed discharge spouts depending from and integral with the curved bottom portion of said support member, a roller rotatably mounted in the curved bottom portion of said support member, trunnions extending from the ends of said roller, ground engaging wheels connected to said trunnions, a plurality of similar hoppers mounted in said support member above said roller, the hoppers being provided with slanting bottom portions, said hoppers including arcuate recessed bottoms which are arranged contiguous to said roller, there being apertures in the bottom of said hoppers, said roller being provided with a plurality of spaced apart pockets, diametrically opposed pins extending outwardly from said hoppers and seated in said slots, said pockets being arranged in groups which are arranged in alignment with said hoppers and spouts, bars secured to the rear of said support member in angular relation thereto, a handle connected to the outer ends of said bars, and wherein when desired, the hoppers can be readily lifted up or removed since the pins provide a detachable mounting for the hoppers, the slots through which the pins extend insuring that the hoppers will be maintained in their proper aligned position with respect to the pockets and discharge spouts, the recessed bottoms of the hoppers insuring that the pockets will only hold and receive one seed, the seed hoppers having their entire weight resting on the roller.

References Cited in the file of this patent

UNITED STATES PATENTS

| | | |
|---|---|---|
| 354,944 | Spangler | Dec. 28, 1886 |
| 1,317,133 | Hilton | Sept. 23, 1919 |
| 2,569,421 | Larson | Sept. 25, 1951 |
| 2,893,610 | Hartley et al. | July 7, 1959 |

FOREIGN PATENTS

| | | |
|---|---|---|
| 393,099 | Germany | Apr. 1, 1923 |